April 19, 1938.　　　　W. E. SYKES　　　　2,114,690

MACHINE FOR GENERATING TAPERED GEARS

Filed Oct. 12, 1934

INVENTOR
William E. Sykes,
BY
Fraser, Myers & Manley.
ATTORNEYS

Patented Apr. 19, 1938

2,114,690

UNITED STATES PATENT OFFICE 2,114,690

MACHINE FOR GENERATING TAPERED GEARS

William E. Sykes, Buffalo, N. Y.

Application October 12, 1934, Serial No. 748,068

5 Claims. (Cl. 90—9)

The present invention relates to a machine for cutting or generating teeth for conical or tapered gears, tapered splines and the like, and more especially tapered herringbone gears. Such tapered gears and splines are adapted for miscellaneous application where a driving connection is desired between two shafts disposed at an angle to each other, and finds particular application where the angle between the connecting shafts is not more than approximately 10°.

Tapered gears may be divided into two distinct classes: (1) the most usual kind in which the axes of the connecting shafts are disposed at a right angle; and (2) where the angle of the shafts is much less than a right angle.

The cutting of such tapered gears as set forth under (2) in the preceding paragraph in so far as it has heretofore been found practicable was effected by what is known as the end milling process, and there only for gears of relatively large pitch, that is to say, pitches of more than one inch. And even for these heavy pitches the process is slow and expensive and therefore of limited utility. For finer pitches other processes, especially the known generating processes as applied to other types of gears are desirable, if not necessary. But up to the present no satisfactory generating process for cutting tapered herringbone gears has been proposed.

It is accordingly an object of the present invention to provide a machine or an attachment for a machine for, and a method of, cutting teeth for such tapered gears, especially those having a slight angle of taper and adapted for connecting shafts the axes of which form an angle of approximately not more than 10° with each other, in a commercially practicable and satisfactory manner. Another object is to provide a machine and method which will enable the two tapered helical gears constituting the herringbone gear to be simultaneously and accurately produced.

The foregoing and other objects of my invention not specifically enumerated I accomplish by mounting the gear blank to be cut upon an arbor, the axis of which lies in a common plane with the axis of the cutter and at an angle thereto approximately corresponding to the taper of the conical surface of the blank, so that said conical face presented to the cutter at its line of intersection with the plane of the axes of the arbor and cutter will be substantially parallel to the cutter axis and thereupon generating the teeth in a well known manner. This may be accomplished on the gear generating machines of the type disclosed in applicant's prior Patents Nos. 1,750,029 and 1,750,030, of March 11, 1930. Where the machines and methods of said patent are to be followed I prefer to modify the gear blank holding arbor so as to make it adjustable to the small angles of taper of the gears to be cut, and I have herein shown one specific manner of accomplishing this.

The invention will be better understood from the detailed description which follows, when considered in conjunction with the accompanying drawing, wherein Figure 1 schematically shows the application of my invention to a gear generating machine of the type disclosed in my aforementioned Patent No. 1,750,030.

Figure 1:
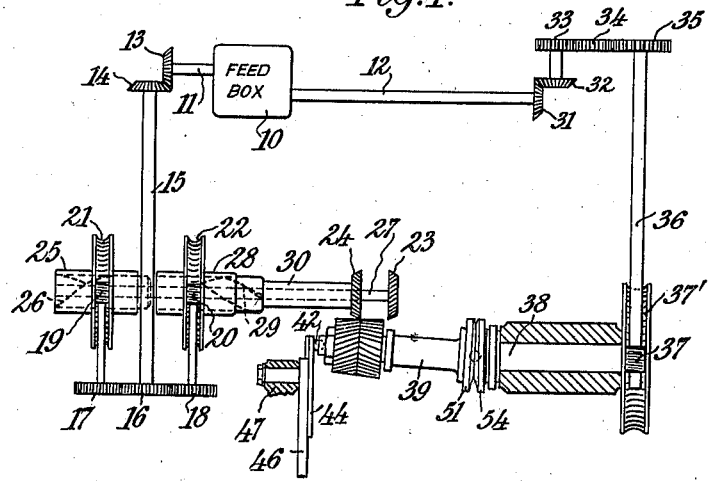

The gear generating machine which is schematically shown in Fig. 1 and which is more fully described in my prior patent, No. 1,750,030, may be said to consist of a feed box 10 containing a source of driving power to which are connected shafts 11 and 12. The shaft 11 through the medium of bevel gears 13 and 14 drives the shaft 15, which, in turn, through the driving gears 16, 17 and 18, worms 19 and 20 and worm wheels 21 and 22, operate the cutters 23 and 24. The worm wheel 21 has an axial bushing 25 within which is mounted a helical slide 26 suitably connected to a shaft 27 to which the cutter 23 is affixed, and through the agency of said worm wheel and helical slide there is imparted to the cutter three distinct movements, namely, a reciprocatory movement across the face of the cutter blank, a twisting movement by which it is enabled to cut teeth of helical shape, and a continuous rotary movement of the same peripheral velocity as that of the blank. Within the bushing 28 of the worm wheel 22 there is a second helical slide 29 connected to the shaft 30 which imparts movements to the cutter 24 analogous to those imparted to the cutter 23. In the operation of the machine a bodily movement is also imparted to the cutter by which they are relieved at the end of the cutting stroke, but the means for accomplishing this are not herein disclosed.

The shaft 12 through a pair of bevel gears 31 and 32, a set of change gears 33, 34 and 35, shaft 36, worm 37 and worm wheel 37', imparts rotary motion to a spindle 38 for driving an arbor 39.

The axis of the arbor 39 lies in a common plane with the axis of the cutters 23 and 24, and the said arbor 39 is mounted for angular adjustment within said plane so as to change the angularity between the axis of the arbor and the axis of the cutters within a limited range. A preferred manner in which I propose to accomplish this, is as follows: The arbor at its opposite ends is provided with hemispherical axial recesses 40 and 41 adapted to engage ball end centers 42 and 43 to provide universal relatively rotatable connections therewith. The ball end 42 is rigidly affixed to a slide 44 having a central longitudinal opening 45 therethrough. The slide 44 is adjustably mounted upon a bracket 46 rigidly secured in a bearing 47, the said bracket having a plurality of screw-threaded openings 48 longitudinally spaced apart centrally thereof and within which openings are engageable clamping screws 49, three of which are herein shown. These clamping screws extend through the opening 45 in the slide, and the shoulders beneath the heads of said clamping screws are adapted to be tightened against a sunken shoulder 50 in the face of the slide extending around the periphery of the opening 45 to hold said slide in any adjusted position with respect to the bracket. The arbor 39 at its opposite end is enlarged and has mounted thereon in concentric relation to the socket 41 a bevel crown gear 51, which latter may be suitably held upon the arbor in any approved manner, and as herein shown, as seating within an annular rabbet 52 and secured to the flange thereof by bolts 53.

For driving of the arbor 39, the spindle 38 has mounted on the end thereof adjacent the arbor a bevel crown gear 54 in meshing relation with the gear 51, the said gear 54 being mounted upon the spindle in a manner analogous to that in which the gear 51 is mounted upon the arbor. To insure proper meshing of the crown gears 51 and 54 for various angular adjustments of the arbor, shims 55 and 56, indicated by heavy lines, may be inserted between the said gears and the flanges on the arbor 39 and spindle 38, respectively.

For supporting a tapered gear blank 57 upon the arbor the latter may be formed with a reduced tapered portion 58 for engaging the tapered bore of the blank, and for holding said blank on the arbor the end thereof formed with the socket 40 may be further reduced and screw-threaded, as indicated at 59, to accommodate a lock nut 60. For facilitating the removal of the blank from the arbor the latter may be formed intermediate its ends with a screw-threaded portion 61 for accommodating a disengaging nut 62 which is adapted after the lock nut 60 is removed to force the blank out of engagement with the arbor spindle portion 58.

Figure 2:
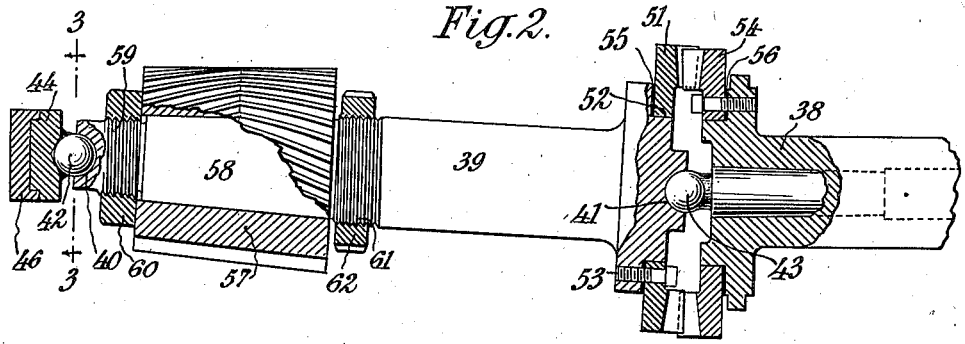
Fig. 2 is an enlarged longitudinal section of the gear blank supporting arbor.
Figure 3:
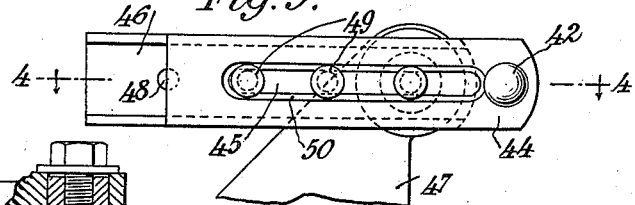
Fig. 3 is an end face view of an adjustable arbor bearing, said view being taken substantially along the plane of the line 3—3 of Fig. 2.
Figure 4:
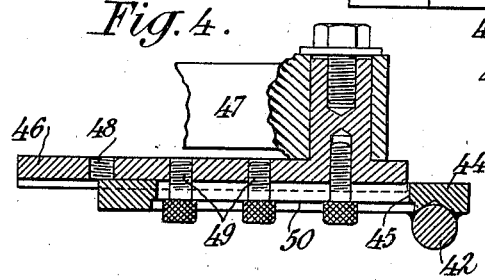
Fig. 4 is a section taken substantially along the plane of the line 4—4 of Fig. 3.

In the operation of the device the tapered blank 57 is mounted upon the arbor and held thereon by the lock nut 60. By means of the slide 44 the angularity of the arbor is adjusted to correspond to the degree of taper of the blank so that the line of intersection between the blank and the common plane of the axes of the arbor and the cutters at the face of the blank presented to the cutters will be substantially parallel to the axis of the cutters. The universal mounting of the arbor upon the ball ends 42 and 43 will provide a suitable support for the arbor, while the meshing of the crown gears 51 and 54 will insure a rotary driving connection between the spindle 38 and the arbor 39. The blank is then moved inwardly toward the cutters until contact is barely made, and the machine is then adjusted in the usual manner so that the cutters in their reciprocatory movement will pass across the face of the gear blank for a distance substantially equal to the half width thereof, the cutters beginning their operative strokes from the opposite edges of the blank and finishing said strokes upon the same line, that is, the median line of the face of the blank. The other necessary adjustments are then completed for the cutting of the teeth to the desired depth, as set forth at length in my prior patent aforementioned.

Where it is desired to cut a tapered gear having a reversed taper to that shown in Fig. 2 it will be apparent that the arbor may be modified so as to readily accomplish this. Or if desired, the same arbor may be employed, and instead of adjusting the slide 44 inwardly toward the cutter axis as shown in Fig. 1, said slide may be adjusted outwardly with respect to said axis so as to bring the line of intersection between the tapered blank surface and the common plane of the axes into parallelism with the cutter axis.

Herringbone gears produced in accordance with the method and machine hereinbefore described will have all the beneficial characteristics possessed by herringbone gears for connecting parallel axes, and the additional characteristic that they will connect shafts having intersecting axes providing the angle of the axes is not more than approximately 10°, and further providing that the cone distance—that is to say, the distance between the large end of the teeth and the apex of the cone—is exceptionally large. This may be explained alternatively by saying that there is a definite limitation of the width of the face of such gears in proportion to the cone distance.

The characteristics of the gears produced in the manner described may be set forth as follows: Each gear has a conical surface; the tooth contours in sections at right angles to the axis and in sections at right angles to the conical surface will be approximately involute. Said contours may be made exactly involute by suitably modifying the cutting tools. The involute curves, however, will be involute across the whole width of the face to the same base circle, or, in other words, to a base cylinder. They will not have as in ordinary bevel gears, a conical base element.

The lead of the helices on such gears will be uniform and constant, or, in other words, the same as the lead on the cylinder. The helical angle, so-called, however, will gradually vary across the width of face due to the variation in diameter, but this is of no practical consequence. There is the question as to whether the tooth thickness will vary theoretically correctly in such a way as to give a correct theoretical bearing surface; but in practice it is found that such gears function satisfactorily and that the bearing surface on the teeth is correct for all practical purposes, though probably not mathematically correct.

The method hereinbefore described in producing such gears is much more economical than any other method developed with which I am familiar. It permits bevel gears to be cut at one operation instead of in three operations as in other generating machines where a gashing cut is to be taken and then two separate cuts, one for each side of the teeth, making in all three separate cutting operations.

Although I have hereinbefore described the invention as directed to the production of tapered herringbone gears, it will be apparent that it is equally applicable to the cutting of tapered splines, tapered single helical gears and the like by suitably varying the cutters and the mechanism controlling the stroke of the cutter. It will also be apparent that the invention, although it is here described as applied to a gear cutting machine of the type disclosed in my prior patent, No. 1,750,030, in its underlying concept is applicable to rack and other types of gear cutting machines either by modification thereof or as an attachment thereto. Accordingly I do not wish to be limited to the details of construction disclosed, since it will be apparent to one skilled in the art that these are subject to modification and change without departing from the spirit of the invention.

What I claim is:

1. A machine for cutting gear teeth upon a blank having a conical surface, which comprises a main spindle, a cutter operatively mounted for axial reciprocatory and rotative movement, an arbor for the gear blank having an axis disposed in a common plane with the axis of the cutter and angularly adjustable with respect to the cutter axis in said plane, means for rotating said arbor in any adjusted position from the main spindle comprising a pair of crown gears at one end of the arbor, and a ball and socket support for said arbor at said end.

2. A machine for cutting gear teeth upon a blank, which comprises a cutter of gear or pinion formation operatively mounted for axial reciprocatory movement, an arbor for the gear blank having an axis disposed in a common plane with the axis of the cutter and angularly adjustable with respect to said cutter axis in said plane, a pair of bearing supports providing for such adjustability for said arbor, and one of said bearing supports being adjustable transversely of the axis of the arbor in the common plane of the axes.

3. A machine for cutting gear teeth upon a blank, which comprises a cutter operatively mounted for reciprocatory movement, an arbor for the gear blank having an axis disposed in a common plane with the axis of the cutter and angularly adjustable with respect to said cutter axis in said plane, a pair of ball-end bearing supports for said arbor, one of said bearing supports being non-axially adjustable in the common plane of the axes and said arbor having socket-ends for engagement with the ball ends of the bearing supports.

4. A machine for cutting gear teeth upon a blank, which comprises a cutter operatively mounted for reciprocatory movement, an arbor for the gear blank having an axis disposed in a common plane with the axis of the cutter and angularly adjustable with respect to said cutter axis in said plane, a pair of bearing supports for said arbor, one of said bearing supports being fixed and the other being carried by a slide which is adjustable toward and away from the cutter axis in the common plane of the cutter and the arbor axes, the supporting engagement of the arbor upon the bearing supports being provided by universal relatively rotatable connections and means for rotating the arbor through its end supported by the fixed bearing.

5. A machine for cutting gear teeth upon a blank, which comprises a cutter operatively mounted for reciprocatory movement, an arbor for the gear blank having an axis disposed in a common plane with the axis of the cutter and angularly adjustable with respect to said cutter axis in said plane, a pair of bearing supports for said arbor, one of said bearing supports being fixed and the other being carried by a slide which is adjustable toward and away from the cutter axis in the common plane of the cutter and the arbor axes, the supporting engagement of the arbor upon the bearing supports being provided by universal relatively rotatable connections and meshing crown gears at the fixed bearing end of the arbor for rotating the arbor.

WILLIAM E. SYKES.